(12) United States Patent
Lee

(10) Patent No.: US 11,702,979 B1
(45) Date of Patent: Jul. 18, 2023

(54) ELECTRICITY GENERATION SYSTEM AND METHODS OF MAKING AND USING THE SAME

(71) Applicant: Brent Wei-Teh Lee, Saratoga, CA (US)

(72) Inventor: Brent Wei-Teh Lee, Saratoga, CA (US)

(*) Notice: Subject to any disclaimer, the term of this patent is extended or adjusted under 35 U.S.C. 154(b) by 0 days.

(21) Appl. No.: 17/736,870

(22) Filed: May 4, 2022

Related U.S. Application Data

(60) Provisional application No. 63/304,812, filed on Jan. 31, 2022.

(51) Int. Cl.
*F02C 3/16* (2006.01)
*F02C 7/22* (2006.01)
*F02C 7/36* (2006.01)
*F02K 7/10* (2006.01)

(52) U.S. Cl.
CPC .............. *F02C 3/165* (2013.01); *F02C 7/222* (2013.01); *F02C 7/36* (2013.01); *F02K 7/10* (2013.01); *F05D 2240/35* (2013.01); *F05D 2260/40311* (2013.01); *F05D 2260/60* (2013.01)

(58) Field of Classification Search
CPC .......... F02C 3/16; F02C 3/165; F03D 1/0608; F03D 7/0276; F05D 2240/242
See application file for complete search history.

(56) References Cited

U.S. PATENT DOCUMENTS

| | | | | |
|---|---|---|---|---|
| 8,033,092 B2 * | 10/2011 | Suciu | ...................... | F01D 5/187 60/39.43 |
| 10,519,858 B2 | 12/2019 | Lee | | |
| 2004/0025490 A1 * | 2/2004 | Paul | .................... | B64C 29/0075 60/39.43 |
| 2022/0120216 A1 | 4/2022 | Lee | | |

* cited by examiner

*Primary Examiner* — Steven M Sutherland
(74) *Attorney, Agent, or Firm* — Andrew D. Fortney; Central California IP Group, P.C.

(57) ABSTRACT

An electricity generating system is disclosed. The system includes one or more rotary arms extending from a central hub, a tube or blade with an air passage therein extending from each of the one or more rotary arms, a set of rotary blades operably connected to the tube or blade, an axle or shaft joined or fixed to the central hub, and a generator operably connected to the axle or shaft. The air passage has one or more air inlets at or near an end of the tube or blade connected or joined to a corresponding rotary arm. The set of rotary blades is configured to provide a force that rotates the tube or blade. The axle or shaft is configured to rotate with the central hub. The generator is configured to convert a torque from the axle or shaft to electricity.

21 Claims, 6 Drawing Sheets

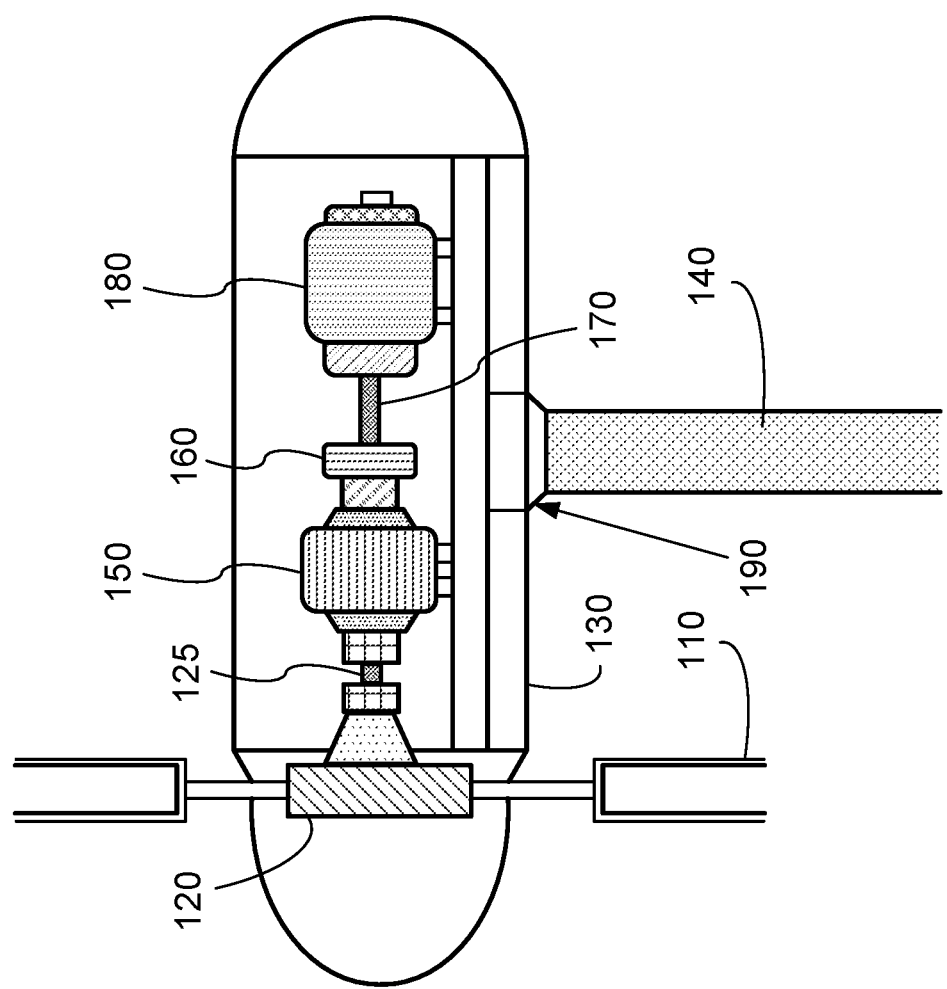
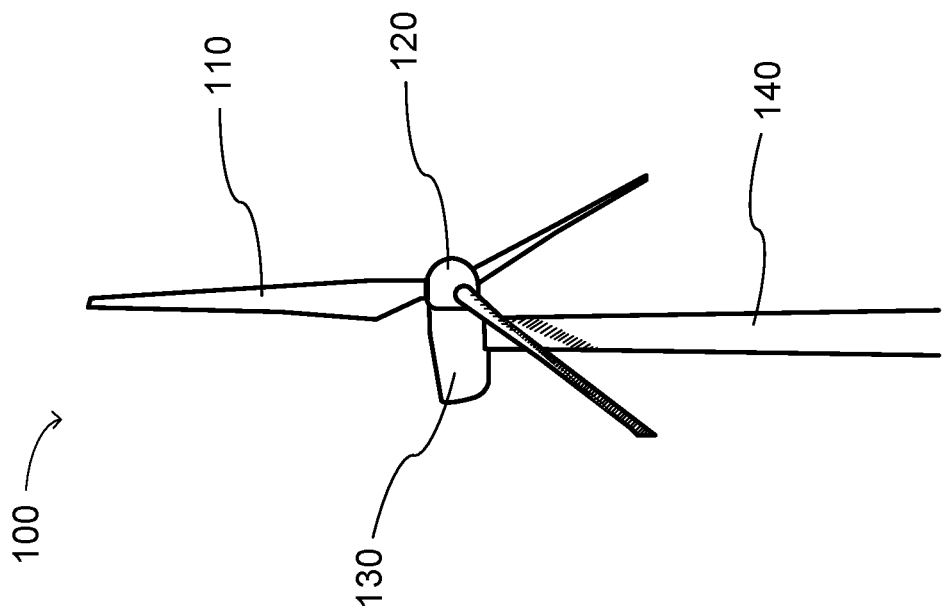

B-B'

US 11,702,979 B1

ELECTRICITY GENERATION SYSTEM AND METHODS OF MAKING AND USING THE SAME

CROSS REFERENCE TO RELATED APPLICATION

This application claims the benefit of U.S. Provisional Patent Application No. 63/304,812, filed on Jan. 31, 2022, incorporated herein by reference as if fully set forth herein.

FIELD OF THE INVENTION

The present invention generally relates to the field of electrical power generation. More specifically, embodiments of the present invention pertain to a rotary power generation apparatus including one or more rotating arms and a corresponding number of fans or propellers connected thereto, methods for converting energy and/or generating electricity using the same, and methods of making the same.

DISCUSSION OF THE BACKGROUND

Wind turbines are manufactured in a wide range of designs, in which the blades of the turbines can rotate around either a horizontal axis or vertical axis. Modern commercial applications of wind turbines focus more on designs in which the blades rotate around a horizontal axis.

FIG. 1A shows a typical horizontal wind turbine 100 for electricity generation. The horizontal wind turbine 100 includes three blades 110, a hub 120 to which the blades 110 are attached, a nacelle 130 that houses the electricity-generating equipment, and a tower 140 supporting the nacelle 130, hub 120 and blades 110. Together, the blades 110 and the hub 120 form a rotor.

FIG. 1B shows the interior of a typical nacelle 130 on the tower 140 of a horizontal wind turbine. The components in the nacelle 130 include a low-speed (or main) shaft 125 connected to and rotating with the hub 120, a gear box 150, a brake 160, a high-speed shaft 170, a generator 180, and a yaw bearing and motor 190 that maintain or change the direction of the nacelle 130, depending on the direction of the wind. The gear box 150 transfers torque from the low-speed shaft 125 to the high-speed shaft 170, frequently increasing the rate of rotation of the low-speed shaft 125 by a factor of 50-fold to 100-fold or more in the high-speed shaft 170. Electricity generated by the generator 180 is carried by an electrical cable (not shown) to a battery (for storage) or to an inverter or converter for transfer to an electrical grid. Some horizontal wind turbines further include for each blade 110 a pitch bearing (not shown) bolted to the hub 120. A pitch bearing (or, perhaps more accurately, a motor controlling the position of the pitch bearing) adjusts the pitch (angle of attack) of the blade 110 relative to the direction of the wind, according to the wind speed, to control the rotational speed of the rotor. Typically, operations of the brake 160, the yaw bearing and motor 190, and (when present) the pitch bearing or pitch bearing motor are controlled by a controller (not shown) that typically receives wind speed and direction information from an anemometer (not shown) mounted on or connected to the nacelle 130.

A predominant trend in development of turbines such as horizontal wind turbine 100 has been to increase the blade length and the tower height for higher power generation. From 1990 to 2016, the blade/rotor diameter of 24 meters increased to 109 meters, and power generation of 50 kW in 1990 increased to 2848 kW in 2016.

However, the horizontal wind turbine 100 requires a minimum wind speed or velocity (sometimes called the "cut-in speed") to operate. For larger turbines, the minimum wind speed is about 4 meters per second, although some smaller wind turbines can operate at lower wind speeds. A need is felt for turbines and other apparatuses useful for generating electricity that do not depend on the wind in order to operate.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a system for generating electricity, comprising one or more rotary arms extending from a central hub, a tube with an air passage therein extending from each of the rotary arm(s), a combustion or detonation chamber at a distal end of each tube configured to receive air from the air passage and fuel from a fuel supply conduit, a Pelton wheel configured to receive heated or expanded air and combustion gases from the combustion or detonation chamber, a propeller or other set of rotary blades driven by the Pelton wheel, an axle or shaft joined or fixed to the hub and configured to rotate with the hub, and a generator operably connected to the axle or shaft, configured to convert a torque from the axle or shaft to electricity. Each tube has one or more air inlets at an end at which the tube is connected or joined to the corresponding rotary arm.

More specifically, the electricity generating system comprises one or more rotary (e.g., support) arms extending from a central hub, a tube or blade with an air passage therein extending from each of the one or more rotary arms, a combustion or detonation chamber at a distal end of the tube or blade, a set of rotary blades operably connected to the tube or blade, an axle or shaft joined or fixed to the central hub and configured to rotate with the central hub, and a generator operably connected to the axle or shaft, configured to convert a torque from the axle or shaft to electricity. The air passage has one or more air inlets at or near an end of the tube or blade that is connected or joined to a corresponding rotary arm. The combustion or detonation chamber is configured to (i) receive air from the air passage and fuel from a fuel supply conduit, and (ii) heat or expand the air from the air passage. The rotary blades are configured to provide a force that rotates the tube or blade in response to the air that is heated or expanded by the combustion or detonation chamber. In most embodiments, the set of rotary blades comprises a propeller connected to the Pelton wheel (e.g. through a rotary shaft).

In some embodiments, the tube or blade further comprises a nozzle downstream from the combustion or detonation chamber, configured to output heated or expanded air and combustion gases from the combustion or detonation chamber. In other or further embodiments, the system may further comprise a Pelton wheel configured to receive the heated or expanded air and combustion gases from the combustion or detonation chamber (or nozzle) and rotate in response thereto. In the latter case, the set of rotary blades may be driven by rotations of the Pelton wheel.

In some embodiments, the combustion or detonation chamber comprises a ramjet configured to burn or detonate the fuel and heat the air from the air passage. The ramjet may comprise a manifold configured to distribute the fuel to a plurality of sprayers or injectors in the combustion or detonation chamber. In other or further embodiments, the system may further comprise a fuel supply conduit in fluid communication with the manifold, configured to supply the fuel to the combustion or detonation chamber (e.g., the manifold). In some additional or alternative embodiments, the combustion chamber may further an igniter configured to ignite the fuel in the combustion chamber. The igniter may be downstream from the manifold and/or fuel injector(s).

In some systems, the rotary/support arm(s) and the tube(s) or blade(s) rotate in a substantially vertical plane (similar to a conventional horizontal wind turbine), and the system further comprises a tower configured to support the rotary/support arm(s), the central hub, the tube(s) or blade(s), the axle or shaft, and the generator. In other systems, the rotary/support arm(s) and the tube(s) or blade(s) rotate in a substantially horizontal plane, and the system further comprises a housing or enclosure configured to house and/or isolate at least the generator. In various examples, the housing includes a roof or frame and a plurality of supports that support the roof or upper frame above the generator. In some examples, the housing or enclosure also houses or isolates (e.g., from an external or outdoor environment) the rotary/support arm(s), the central hub, the tube(s) or blade(s), the combustion or detonation chamber, and the set of rotary blades. In other examples, the axle or shaft may extend from the hub, through the roof or upper frame, and the roof or upper frame may secure a first bearing configured to seal the axle or shaft and allow the axle or shaft to rotate. In general, systems in which the tube(s) or blade(s) rotate in a horizontal plane may be termed a "horizontal system."

Alternatively, the tube(s) or blade(s) rotate in a vertical plane (e.g., a so-called "vertical system"), and the system further comprises a tower configured to support the central hub, the rotary/support arm(s), the tube(s) or blade(s), the axle or shaft, and the generator. In such alternative embodiments, the system may resemble a conventional horizontal wind turbine (HWT). The vertical system may further comprise a nacelle housing at least part of the axle or shaft, the transmission, differential and/or gear box, and optionally, the generator. Optionally, the vertical engine may further comprise an anemometer configured to measure a wind speed, a controller configured to control combustion in and/or the supply of fuel to the combustion or detonation chamber based at least in part on the wind speed. In some embodiments, the generator may further comprise a brake (which may also be housed in the nacelle) configured to stop rotation of the hub and the blades mechanically, electrically or hydraulically (e.g., when the wind speed or the tube/blade rotation rate exceeds a predetermined safety threshold value).

In various embodiments, the system (e.g., the generator) may further comprise a transmission, differential and/or gear box configured to transfer the torque from the axle or shaft to a high-speed shaft adapted to rotate at a faster rate than the axle or shaft. The system and/or generator may comprise additional components of a conventional generator, such as the generator in the nacelle 130 shown in FIG. 1B.

In some embodiments, the tube or blade further comprises a fan at or in at least one of the air inlet(s), configured to rotate in response to the air entering the air inlet. In such embodiments, the system may further comprise a propeller connected to the fan (e.g., through a rotary connecting shaft that passes through a wall of the tube or blade). The connecting shaft is generally connected to each of the fan and the propeller.

Typically, the rotary/support arm(s) and the tube(s) or blade(s) have a combined length of from 1 to 120 m, and the central hub typically has a diameter of from 10 cm to 8 m. In most cases, the air inlet(s) face a direction of rotation of the tube or blade, to allow the air to enter the air passage. In some embodiments, the tube or blade has an aerodynamic cross-sectional shape, but the invention does not require this feature, particularly when the combined rotary/support arm and tube or blade has a relatively short length (e.g., 10-20 m or less).

Typically, the number of rotary/support arms, tubes or blades, air passages, fuel distribution conduits, combustion/detonation chambers, and nozzles (when present) are equal or the same (e.g., they are in a 1:1 relationship).

In various embodiments, the system comprises x rotary/support arms and tubes or blades, wherein x is a positive integer by which 360 can be divided to give an integer or a regular fraction. For example, the engine may comprise at least three (e.g., 3, 4, 5, 6, 8, 9, 10, or 12) rotary/support arms and tubes or blades. When there is more than one tube or blade, each of the tubes or blades generally has the same dimensions and shape, and may be (but is not necessarily) designed to provide at least some aerodynamic lift.

In some embodiments, the system may further comprise a fuel storage tank or vessel and/or a pump. The fuel storage tank or vessel may have an outlet and/or valve operably connected to the fuel supply conduit. The pump may be configured to receive the fuel from the fuel storage tank or vessel, and output the fuel into the fuel supply conduit.

In other or further embodiments, the system may further comprise a first, relatively small battery configured to provide an electrical charge to each igniter. Alternatively or additionally, the system may further comprise a second, relatively large battery configured to store electrical charge from the generator.

A still further aspect of the present invention concerns a method of generating electricity, comprising drawing air into one or more air inlets in a tube or blade that is connected or joined to a rotary arm, flowing the air through an air passage in the tube or blade, receiving the air from the air passage in a combustion or detonation chamber at a distal end of the tube or blade, supplying a fuel to the combustion or detonation chamber from a fuel supply conduit, combusting or detonating the fuel in the combustion or detonation chamber to heat or expand the air from the air passage, rotating a set of rotary blades operably connected to the tube or blade in response to the air heated or expanded by the combustion or detonation chamber (thereby providing a force that rotates the tube or blade), rotating an axle or shaft joined or fixed to the central hub to generate a torque, and converting the torque to electricity using a generator. The air inlet(s) are at or near an end of tube or blade proximate to the rotary arm.

In some embodiments, the method further comprises outputting the heated or expanded air and combustion gases from a nozzle at the distal end of the tube or blade, downstream from the combustion or detonation chamber, receiving the heated or expanded air and combustion gases from the nozzle in a Pelton wheel configured to rotate in response thereto, and driving the set of rotary blades by rotations of the Pelton wheel. In other or further embodiments, the method further comprises distributing the fuel to a plurality of sprayers or injectors in the combustion or detonation chamber using a manifold, pumping the fuel from a fuel storage tank or vessel into a fuel supply conduit in fluid communication with the manifold, and/or rotating a fan at or in at least one of the one or more air inlets in response to the air entering the at least one of the one or more air inlets. In the latter case, the fan is operably connected (e.g., through a connecting rotary shaft) to a propeller configured to provide additional force to rotation of the tube or blade. The connecting shaft may be connected to each of the fan and the propeller, and the connecting shaft may pass through a wall of the tube or blade.

In various embodiments, the method may further comprise supplying the fuel to the combustion or detonation chamber through a fuel supply conduit, pumping the fuel from a fuel storage tank or vessel into a fuel supply conduit, storing said fuel in the fuel storage tank or vessel, injecting the fuel into the combustion chamber from a plurality of sprayers or fuel injectors in fluid communication with a manifold, igniting the fuel in the combustion chamber using a corresponding plurality of igniters, providing an electrical charge to each of the igniters, and/or storing the electricity from the generator in a battery.

In some embodiments (e.g., related to the "horizontal system" described herein), the method may further comprise supporting and/or stabilizing the axle or shaft by passing the axle or shaft through a bearing in a roof or upper frame of a housing configured to house and/or isolate the generator. In such embodiments, the housing may further include a plurality of supports that support the roof or upper frame above the generator.

Alternatively, the method may further comprise supporting the central hub, the rotary arm(s), the tube(s) or blade(s), the axle or shaft, and the generator with a tower. In such alternative embodiments (e.g., in the "vertical system"), the method may comprise rotating the blades in a vertical plane, and the method may further comprise housing at least part of the axle or shaft, a transmission, differential and/or gear box, and optionally the generator, in a nacelle. In further embodiments, the method further comprises transferring the torque from the axle or shaft to a high-speed shaft using a transmission, differential and/or gear box, and rotating the high-speed shaft at a faster rate than that of the axle or shaft. Optionally, the method may further comprise measuring a wind speed with an anemometer, and controlling one or more operations (e.g., ignition, combustion or detonation of the fuel) using a controller, based at least in part on the wind speed. In some embodiments, the method may further comprise stopping rotation of the hub and the blades mechanically, electrically or hydraulically (e.g., when the wind speed exceeds a predetermined safety threshold value) with a brake.

As for the present engine, the plurality of tubes or blades in the present method may comprise x tubes or blades, where x is a positive integer by which 360 can be divided to give an integer or a regular fraction. Thus, x may be at least three (e.g., 3, 4, 5, 6, 8, 9, 10 or 12).

The present invention advantageously has a low-cost construction and a simplified design, and generates a relatively large amount of electricity in low- or no-wind conditions. The present invention can be implemented as a horizontally-rotating turbine, without the need for a tower, thereby eliminating the safety and other risks associated with the tower in horizontal wind turbines (HWTs). These and other advantages of the present invention will become readily apparent from the detailed description of various embodiments below.

BRIEF DESCRIPTION OF THE DRAWINGS

FIGS. 1A-B are diagrams showing a conventional horizontal wind turbine (HWT).

DETAILED DESCRIPTION

Figure 2A:
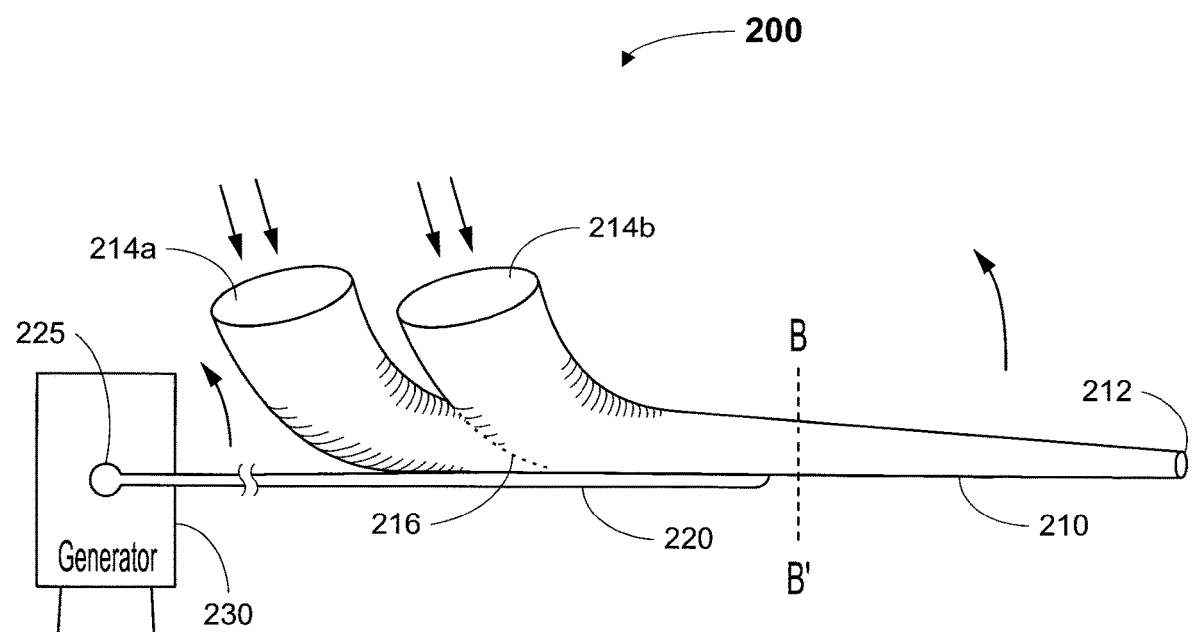
FIG. 2A is a diagram showing an exemplary electricity generator including one or more vertically-rotating arms in accordance with embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

For the sake of convenience and simplicity, the terms "axle," "shaft," and "axis" are generally used interchangeably herein, but are generally given their art-recognized meanings. Also, for convenience and simplicity, the terms "connected to," "coupled with," "coupled to," "joined to," "attached to," "fixed to," "affixed to," "in communication with," and grammatical variations thereof may be used interchangeably, and refer to both direct and indirect connections, couplings, joints, attachments and communications (unless the context of its use unambiguously indicates otherwise), but these terms are also generally given their art-recognized meanings.

The terms "lower" and "upper" are used herein as convenient labels for the same or similar structures having a relative position to the other(s) as shown in the drawings, but which can change their relative position(s) depending on the orientation of the apparatus or other structure in the drawing(s). Similarly, the terms "downstream" and "upstream" are convenient labels for relative positions of two or more components of the apparatus with respect to the flow of one or more gas(es) or fluid(s) within the apparatus.

The present invention concerns an electricity generator that may be somewhat similar to the turbines disclosed in U.S. patent application Ser. No. 17/217,885, the relevant portions of which are incorporated herein by reference. However, the present electricity generator is intended to be independent of any need for wind to generate electricity. In at least one aspect, the system comprises one or more rotary arms, each rotary arm having a hollow tube or blade connected thereto and/or extending therefrom; a ramjet or other combustion chamber at the distal end of each tube or blade, configured to burn or detonate a fuel and heat air passing through the combustion chamber; a nozzle downstream from the combustion chamber, configured to expel or eject the heated air and combustion gases; a Pelton wheel configured to receive the heated air and combustion gases from the nozzle and rotate in a direction determined by the heated air and combustion gases; a propeller connected to the Pelton wheel, configured to provide a force that rotates the rotary arm(s) around a shaft or axle; and a generator, configured to receive a torque from the shaft or axle and generate electrical power from the torque.

When the rotary arm(s) rotate, air in the tube or blade is forced outward (to the combustion chamber at the distal end of the tube or blade) due to centrifugal force. This pulls air into the tube or blade and compresses the air at the distal end of the tube or blade. The compressed air is heated and/or expanded by the combustion of fuel in the combustion chamber, then is expelled or ejected through the nozzle, which drives rotation of a Pelton wheel. The Pelton wheel then drives rotation of a propeller, which provides a thrust or force to rotate the rotary arm(s). When configured as a horizontally-rotating engine, the blades may provide lift, offsetting or reducing certain frictional forces in the engine due to gravity, and in some cases, effectively causing the blades, hub and axle or shaft to "float." When configured as a vertically-rotating engine, the fuel need not be burned or ignited in the presence of sufficient wind. The centrifugal effect on the air in the tube or blade maximizes the thrust or force from heating the air in the combustion chamber and ejecting the heated air through the nozzle. The present system is relatively simple to build, scale up, operate and maintain.

The invention, in its various aspects, will be explained in greater detail below with regard to exemplary embodiments.

An Exemplary Electricity Generating Apparatus

Figure 2B:
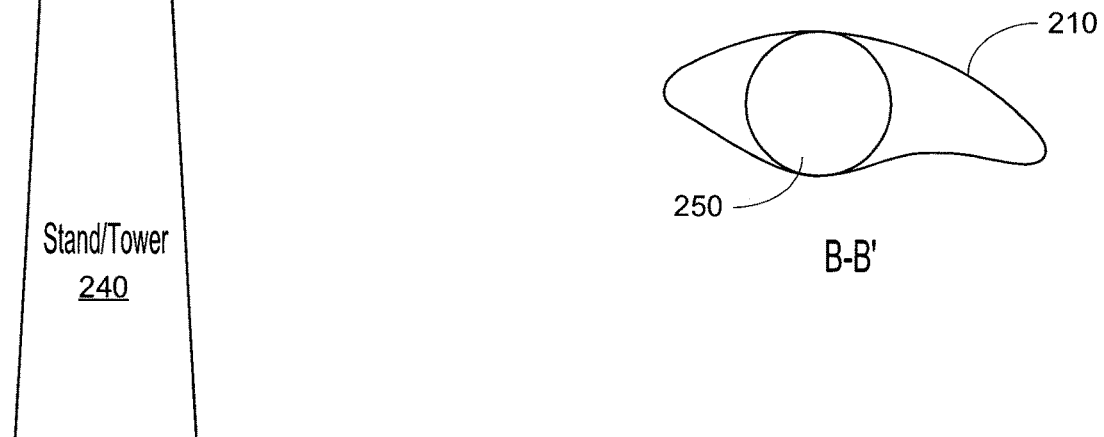
FIG. 2B is a cross-section of the exemplary arm along the line B-B'.

In one aspect, the present invention relates to an electricity generation system. The electricity generation system includes three main sections. FIGS. 2A-B show the first section, comprising a long air conduit or tube 210 and a long support arm 220. The air conduit or tube 210 has a horn-like shape, comprising a long, straight, relatively narrow tube section and a short, curved or angled, relatively wide inlet section. The air conduit or tube 210 shown in FIG. 2A includes first and second air inlets 214a-b and a nozzle 212. The shape of the air inlets 214a-b is generally circular or oval, but the invention is not limited to such shapes. Air from the first air inlet 214a joins air from the second air inlet 214b at a passage or internal opening 216 in the tube 210.

The air conduit or tube 210 may have a length of from 1 to 60 meters, or any length or range of lengths therein. The support arm 220 may also have a length of from 1 to 60 meters, or any length or range of lengths therein. However, the length of the support arm 220 is generally equal to or greater than the length of the air conduit or tube 210. Thus, the support arm 220 may have a length that is 50-80% of the combined length of the support arm 220 and the tube 210.

The air conduit or tube 210 may have a minimum width or diameter (e.g., at the nozzle 212) of from about 5 cm to about 2 meters, and a maximum width or diameter (e.g., at one or both of the inlets 214a-b) of from about 10 cm to about 5 meters, or any minimum and/or maximum width or diameter or range of minimum and/or maximum widths or diameters therein. The support arm 220 may have a width or diameter of from about 2.5 cm to 2 meters, or any width or diameter or range of widths or diameters therein. The width or diameter of the support arm 220 may vary along its length. However, the width or diameter of the air conduit or tube 210 is generally equal to or greater than the minimum width or diameter of the support arm 220.

Air is collected in the air inlets 214a-b and is then compressed at the distal end of the tube due to centrifugal force. Given the formula for centrifugal force ($F=m\omega^2 r$, where F is the force, m is the mass of the air in the tube 210, $\omega$ is the angular velocity, and r is the distance from the origin of rotation to the distal end of the tube 210), the compressive force on the air in the tube 210 is directly related to r. In other words, the longer the tube 210, or the farther away it is from the axis of rotation (i.e., hub 225), the greater the pressure on the air in the tube 210 at the distal end of the tube 210. Thus, a long tube (e.g., 60-100 m) or tube-and-rod assembly can enable high compression of the air at the distal end of the tube 210.

The system 200 as shown in FIGS. 2A-B includes one support arm 220 and one tube or blade 210 (with an air passage or conduit 250 therein; see FIG. 2B), but the system 200 may include any positive integer number n of support arms 220 and tubes or blades 210 that provides another positive integer when 360 is divided by it (e.g., n=2, 4, 5, 6, 8, 9, 10, 12, etc., which respectively give the positive integers 180, 90, 72, 60, 45, 40, 36 and 30 when 360 is divided by n).

The combined length of the support arm 220 and the tube or blade 210 may be, e.g., in the range from 100 cm to 120 m or more, but the longer the combined length, the greater the centrifugal effect on the air, and the greater the effect of combustion of the fuel on rotation of the tube or blade 210 and hub 225. For electricity generation, the combined length of the rod 220 and the tube or blade 210 may be in the range from 60 m to 120 m, and the hub 225 may have an effective diameter of from 100 to 800 cm. More preferably, the rod 220 and the tube or blade 210 have a combined length of from 80 m to 110 m, and the hub has an effective diameter of from 200 to 800 cm.

The rod 220, the tube or blade 210, and the hub 225 may comprise or be made of materials including metals and metal alloys such as aluminum, steel, titanium, nichrome alloys, etc.; carbon, such as carbon fibers; fiberglass; plastics or polymer resins, as described herein; and combinations (e.g., laminates) thereof. The material(s) for the rod 220 and the tube or blade 210 may have a minimum elastic modulus (e.g., Young's modulus) of 2.5 GPa, and in some cases, of 10, 20, or 100 GPa, or any other value that is greater than 2.5 GPa. Thus, high-modulus plastics (e.g., having a minimum elastic modulus of 2.5 GPa) are perfectly suitable for the rod 220 and the tube or blade 210 due to their high strength and light weight, especially in protected environments.

The tube or blade 210 may have a shape designed to provide some measure of aerodynamic lift, similar to a propeller for an airplane. For example, a cross-sectional view of the tube/blade 210 with the air passage 250 therein is shown in FIG. 2B. The cross-section is taken along the line B-B' in FIG. 2A. Such shapes are well-known in the aeronautical and wind turbine arts, and modifications to such shapes so that the lift provided by the tube or blade 210 offsets the weight of the tube or blade 210, rod, 220, hub 225 and axle or shaft (not shown) at a predetermined rate of rotor rotation (which may be an optimum rotation rate for electricity generation) are known to one of skill in the art.

The air passage 250 may occupy most of the interior space in the tube or blade 210. In an alternative approach, the air passage 250 is the entire (or entire remaining) interior space of the tube or blade 210, but flow of the air through the interior space of the tube or blade 210 is generally more turbulent than through a cylindrical air passage 250 (or other conduit having a smooth, continuously-curved inner surface). When the tube or blade 210 has aerodynamic upper and lower external surfaces, the tube or blade 210 also generates lift (e.g., a forward or upward force). When the tube or blade 210 and the support arm 220 rotate in a substantially horizontal plane, aerodynamic external surfaces reduce friction caused by the rotating hub 225 and axle/shaft in the generator 230 due to gravity (e.g., acting on the rotor). Thus, the support arm or rod 220 may have aerodynamic shape for added structural strength and/or to generate additional lift/force. The engine 200 therefore becomes very efficient.

To reduce or minimize its weight, the tube or blade 210 may have a hollow or substantially hollow interior, although one or more structures may be included in the hollow interior, such as the air passage 250, a fuel distribution line or conduit 310 (FIG. 3), and/or an electrical line (e.g., wire) supplying an electrical charge (e.g., spark) to an igniter in the combustion chamber 300. When the tube or blade 210 (which also may be tapered) is cylindrical or conical, its length may be limited only by its structural strength.

Referring back to FIG. 2A, the tube or blade 210 may have a plurality of air inlets or openings 214a-b that allow air into the tube or blade 210, and more specifically, into the air passage 250. The air inlets 214a-b face the direction of rotation of the tube or blade 210. The air inlets 214a-b may be circular, oval, square, rectangular, hexagonal or any other suitable shape, and may have a height or diameter that is 1-20% of the length of the tube or blade 210 (or any percentage or range of percentages therein) and a width or diameter that is 50-100% (or any percentage or range of percentages therein) of the width or diameter of the tube or blade 210 at the end nearest to the rod 220. The air passage 250 may have a height and a width that is 50-99% of the height and width of the tube or blade 210, respectively.

The combined length of the support arm 220 and the tube or blade 210 plays a very important role, because centrifugal force (e.g., on the air in the passage 250) is directly proportional to the combined length of the support arm 220 and the tube or blade 210 when the rotor rotates. Therefore, at the distal ends of the tube or blade 210, air inside the tube or blade 210 (e.g., in the passage 250) is under great pressure because of the centrifugal force when the tube or blade 210 is sufficiently long (e.g., at least 15 m, 20 m, or more). The longer the blade, the denser the air at the inlet to the combustion chamber 300.

The tube or blade 210 is joined or connected to the support arm 220 by welding, a plurality of screws, bolts or bolt-and-nut connectors, one or more rings or clamps, an adhesive, or a combination thereof. The support arm 220 is conventionally joined or connected to the hub 225, which is in turn conventionally joined or connected to the axle or shaft in the generator 230.

The hub 225 may independently have a height and a diameter from 10 cm to 8 m or any value or range of values therein. For electricity generation, larger values are preferred, such as a height of 2-6 m and a diameter of 3-8 m, although the invention is not limited by these values. Alternatively, the height and/or diameter of the hub 225 may be 1-20% of the combined length of the support arm 220 and the tube or blade 210 (or any value or range of values therein), although the invention is not limited by these values.

The central hub 225 is connected, joined or fixed to (and thus rotates) an axle or shaft in the generator 230. The generator 230 is conventional (e.g., the generator in FIG. 1B). A transmission, differential or gear box (e.g., 150 in FIG. 1B) in the generator 230 receives torque from a low-speed axle or shaft (e.g., 125 in FIG. 1B), and converts the torque to higher-speed rotations of a second, high-speed axle or shaft (e.g., 170 in FIG. 1B) in the generator 230. Thus, in some embodiments, the high-speed axle or shaft in the generator 230 (FIG. 2A) may rotate at a rate that is p/q times the rate of rotation of the low-speed axle or shaft, where p is an integer≥10, q is an integer≥1, and p≥10*q. In fact, for electricity generation, p/q may be ≥20, 40, 50, or any other integer>10.

When the support arm 220 and the tube or blade 210 rotate in a vertical plane (similar to a conventional horizontal wind turbine), the generator 230 is supported by a stand or tower 240. The generator 230 is conventionally joined or connected to or mounted on the stand or tower 240, in which case the housing of the generator 230 may be a nacelle. The stand or tower 240 may have a height that is 1.1-2 (or any value or range of values therein) times the combined length of the support arm 220 and the tube or blade 210.

Alternatively, the stand or tower 240 can be replaced or removed, and the housing of the generator 230 contacts a substantially flat or planar surface, such as flat ground, or a concrete foundation. In such embodiments, the arm(s) 220 and tube(s) 210 rotate in a horizontal plane, resulting in a so-called "horizontal system." Such a horizontal system can be enclosed in a larger housing, which may have openings therein or ventilation configured to facilitate air flow to and through the tube or blade 210.

In some aspects, it is advantageous to design an electricity generation system similar to a wind turbine, with one or more long blades or arms that rotate in a horizontal plane, around a vertical axis. In such a design, there is no need to build a tall tower to support blades rotating around a horizontal axis (e.g., to be driven by the wind). In addition, the blade(s) or arm(s) may be aerodynamically designed to provide at least some lift, to reduce or eliminate certain frictional forces due to the force of gravity on components of the system such as the blades, the hub, and the axle or shaft. In such embodiments, the blades and hub can effectively "float in the air" as a result of the lift provided by the blades during rotation. Thus, not only is the construction cost of the horizontal system substantially reduced (e.g., relative to a conventional HWT), but also the operating and maintenance costs are lower.

The housing for a horizontal system may include a roof or upper frame and one or more (e.g., a plurality of) supports that enclose the generator 230. The horizontal system may further include a fuel storage tank or vessel and a fuel pump. In such embodiments, the support(s) may comprise a plurality of walls, at least one of which includes a sealable opening such as a door or gate. Alternatively, the support(s) may comprise a single structure, such as a concrete or composite cylinder, frustum or ellipse surrounding the generator 230, the support arm 220 and the tube or blade 210. The fuel storage tank or vessel and the fuel pump may be within the same housing, or may be in a different (e.g., adjacent) housing. In further embodiments, the support(s) for the horizontal system housing may comprise a plurality of pillars or columns (e.g., of concrete, which may be steel-reinforced).

Figure 3:
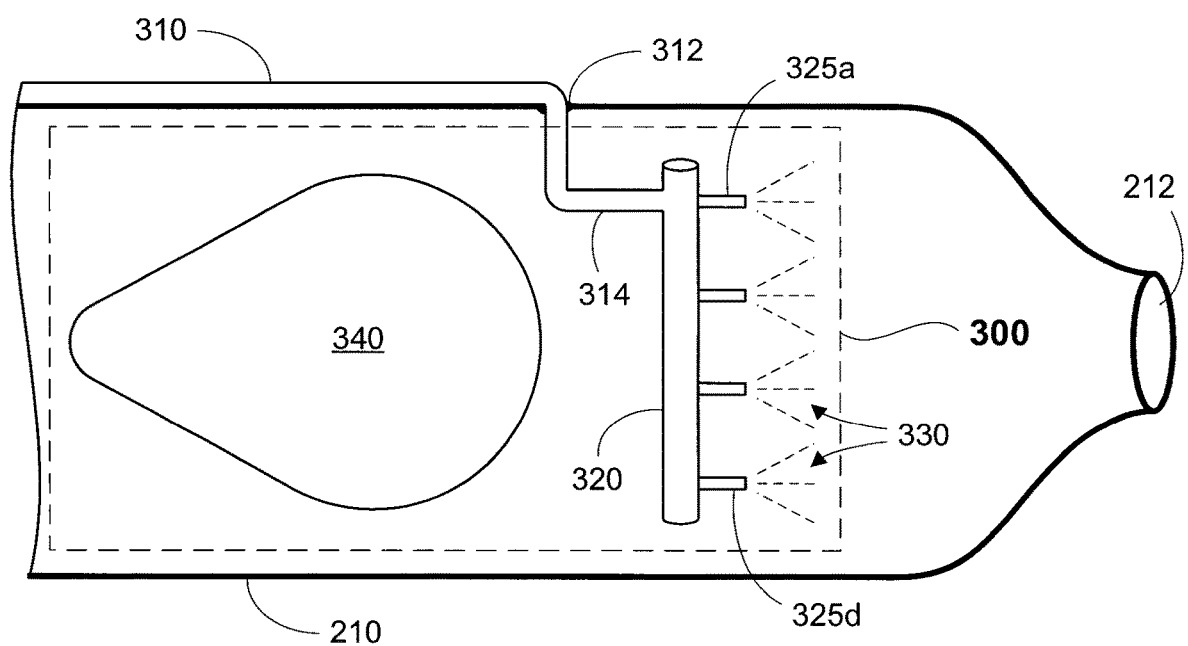
FIG. 3 is a cross-sectional view of an exemplary ramjet that is useful in the present electricity generator, in accordance with one or more embodiments of the present invention.

The second section, shown in FIG. 3, is similar to a ramjet, in which the air is further compressed and then mixed with fuel. The ramjet is attached to or placed in the distal end of the air tube in FIG. 2A. The ramjet includes a stator in the center of the tube (to further compress the air), a fuel injector (including a distributor or manifold) and a constricting nozzle at the end, where the gasses expanded from burning a fuel are exhausted. The stator is secured to the tube by rods and/or a frame (not shown). A fuel supply line runs along the length of the air tube to supply the fuel to the injector. Typically, once the fuel is initially ignited, residual heat may cause the fuel to auto-ignite. The fuel may be supplied continuously through an opening in the injector or through a controlled valve.

FIG. 3 shows a combustion chamber 300 (e.g., a ramjet) are configured to eject heated compressed air and combustion gasses through the nozzle 212. The combustion chamber 300 may be made of or comprise one or more heat-tolerant and/or heat-compatible materials such as metals and metal alloys, ceramics (e.g., high-impact or shatterproof ceramics), or combinations (e.g., laminates) thereof. The combustion chamber 300 may be connected to or mounted on the end of the tube or blade 210, or be contained within the tube or blade 210, in which case it may have a separate housing (not shown). The separate housing has one or more first openings at a first end facing the hub 225 for air to pass into the combustion chamber 300, and one or more second openings at a second end facing the nozzle 212 for heated air and combustion gasses to exit from the combustion chamber 300. The separate housing of the combustion chamber 300 may be mounted or affixed to the inner surface of the tube or blade 210 by welding, bolt-and-nut fasteners, etc., either directly or more preferably through a plurality of extension pieces (not shown), such as short steel rods or blocks.

The combustion chamber 300 may have a length of from 5 cm to 200 cm (or any value or range of values therein) and a diameter or width of from 2.5 cm to 60 cm (or any diameter or range of diameters therein), although the diameter or width of the combustion chamber 300 is less than the diameter or width of the tube or blade 210 at the distal end. Also, in general, when the system 200 includes more than one tube or blade 210 and support arm 220, each combination of the arm 220 and tube or blade 210 is identical to the other(s) (e.g., they have the same dimensions and comprise the same components and materials), and each combustion chamber 300 is identical to the other(s).

In some embodiments, the combustion chamber 300 may comprise a manifold 320 and a compressor or diffuser 340. The manifold 320 receives fuel from a fuel supply line or conduit 310 connected thereto through a high-temperature-tolerant connector 314. The manifold 320 distributes the fuel to a plurality of fuel injectors or sprayers 325a-d. The fuel injectors or sprayers 325a-d may each comprise an atomizer, nebulizer or other similar device configured to generate a fine mist 330 of the fuel inside the combustion chamber 300.

One of the fuel supply line or conduit 310 and the connector 314 passes through a gasket or seal 312 in the wall of the tube or blade 210 and/or the housing of the combustion chamber 300. The fuel distribution line or conduit 310 may be secured to the exterior of the tube or blade 210, as shown in FIG. 3, or along a surface in the interior of the tube or blade 210. The fuel supply line or conduit 310 outside of the tube or blade 210 may be made of steel, a non-porous (but high-strength) ceramic, or other heat-tolerant material, as it may contact (e.g., run along) the exterior surface of the combustion chamber 300. To enable the fuel supply line or conduit 310 to rotate with the central hub 225, the fuel supply line or conduit 310 may be connected to a second, non-rotating fuel supply line or conduit (not shown) between the fuel pump and the hub 225 through a bearing, which may be in or near the hub 225. When configured as an HWT, combustion of the fuel in the combustion chamber 300 enhances wind turbine power production, especially in low- or no-wind conditions.

The compressor or diffuser 340 creates an aerodynamic constriction in the air passage between the tube or blade 210 (e.g., the air passage 250 in FIG. 2B) that further compresses the air immediately prior to combustion. When the combustion chamber 300 comprises a ramjet, combustion may be continuous. As a result, when the combustion chamber 300 further comprises an ignition source (e.g., an igniter or spark plug), it may ignite the fuel only to initiate combustion (e.g., at the outset or beginning of combustion).

The tube or blade 210 may include an interface zone (not shown) between the bulk material of the tube or blade 210 and the combustion chamber 300. The tube or blade 210 is constructed to be stiff (i.e., have a high modulus of elasticity, as described herein) and to be lightweight (i.e., have a low density or specific gravity), so it may preferentially comprise or consist essentially of fiberglass, one or more plastic or polymer resins, and/or a glass- or carbon-fiber-reinforced plastic or polymer resin. Consequently, the bulk of the tube or blade 210 is not necessarily thermally conductive or thermally resistant. On the other hand, the combustion chamber 300 generally must be thermally resistant and preferably is thermally conductive (to dissipate excess heat), and therefore preferentially comprises or consists essentially of a material such as one or more metals, metal alloys and/or thermally-resistant ceramics. The interface zone is where such thermally dissimilar materials are joined to each other, directly (e.g., by a thermally-compatible or expandable adhesive, bolt-and-nut connectors, tongue-in-groove joints, etc.) or indirectly by being joined to one or more mechanically rigid materials with intermediate thermal properties (e.g., having a thermal conductivity and/or coefficient of thermal expansion between those of the materials of the tube or blade 210 and the combustion chamber 300).

Many components of the present system 200 may be constructed using light-weight and low-cost materials, such as fiberglass, carbon fiber, recycled plastics and the like. Even those components that require metal or another thermally-conductive material can be made using relatively light-weight and low-cost materials, such as aluminum or an alloy thereof (e.g., with up to 10% by weight of Cu, up to 0.5% by weight of vanadium and/or zirconium, up to 10% by weight of Mg and/or Ce, up to 20% by weight of Si, combinations thereof, etc.).

Figure 4A:
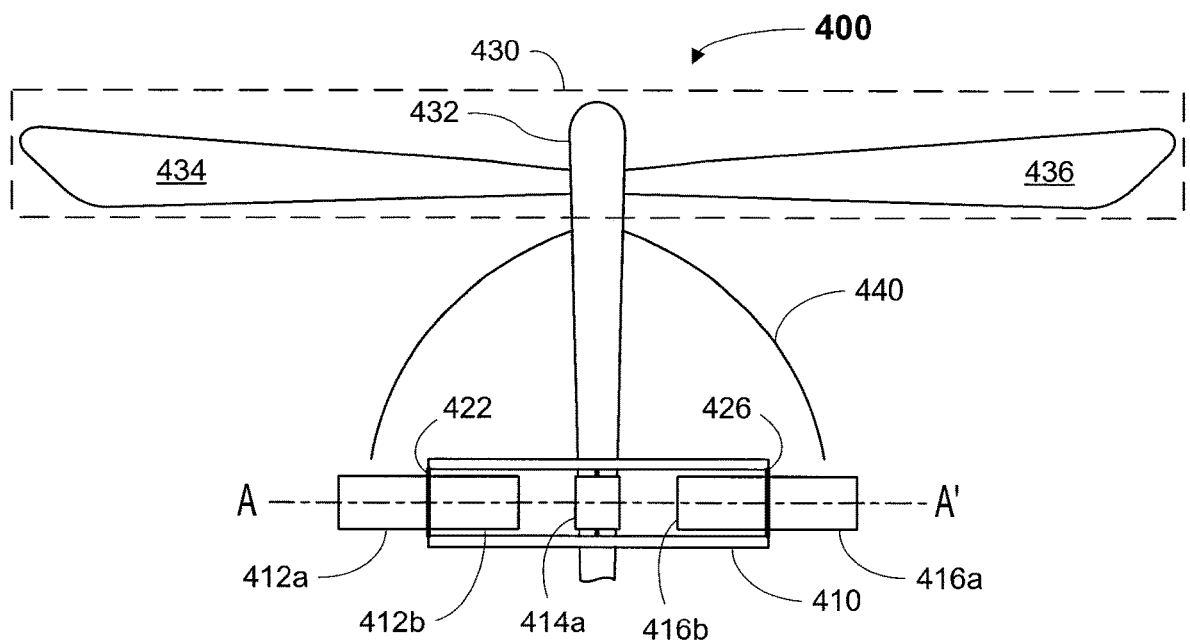
FIG. 4A is a top view of an exemplary Pelton wheel-based propeller that is useful in the present electricity generator, in accordance with one or more embodiments of the present invention.
Figure 4B:
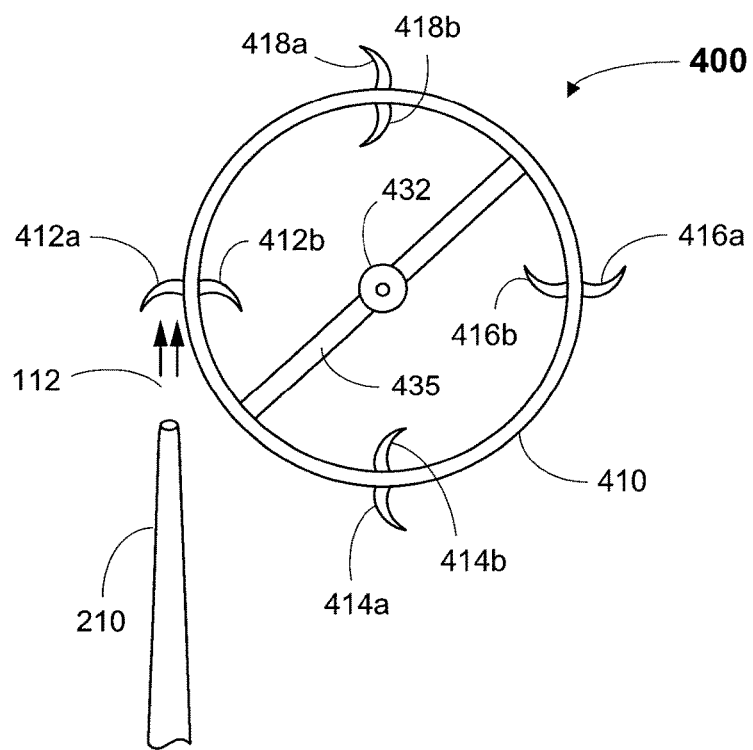
FIG. 4B is a front view of the Pelton wheel in FIG. 4A, receiving an output from the tube in FIG. 2A.
Figure 4C:
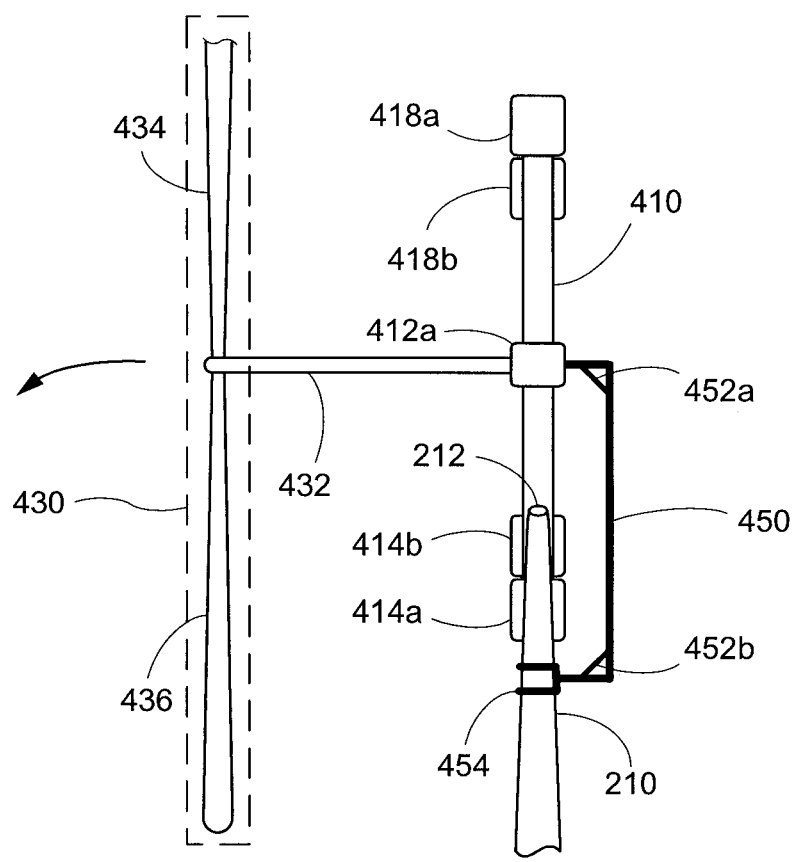
FIG. 4C is a side view of the Pelton wheel-based propeller in FIG. 4A and the arm as shown in FIG. 4B.

In the design shown in FIGS. 2A and 3, a relatively small combustion chamber 300 with a nozzle 212 at its outlet are at the distal end of the tube or blade 210 to fully utilize the compressed air in the tube or blade 210 for the combustion chamber 300 and nozzle 212 to generate thrust (in turn, used by the Pelton wheel in FIGS. 4A-B to drive rotation of a propeller 430; FIGS. 4A and 4C). The nozzle 212 may be configured to increase the force with which the heated air and combustion gases exit the combustion chamber 300. The nozzle 212 may have a width, radius or inner diameter that is 25-90% of the width, radius or inner diameter of the combustion chamber 300, or any percentage or range of percentages therein, although the invention is not limited to such values.

In this aspect of the present invention, the tube or blade 210 and support arm 220 may replace the blades in a conventional HWT, and the combustion chamber 300 and nozzle 212 at the distal end of each tube or blade 210 provides power for a Pelton wheel and propeller to rotate the rotary arm 220 and tube 210. Therefore, such embodiments do not rely on the interaction between the wind and the turbine blades. Consequently, it can be operated in all weather conditions, day and night.

FIGS. 4A-C show the third section of the present system, in which the expanded gas exhausted from the ramjet (i.e., combustion chamber 300) is thrust at high speed into collectors or vanes 412a-b, 414a-b, 416a-b and 418a-b on a Pelton wheel 410, which is connected to the air tube or blade 210 by a connector arm or frame 450 (FIG. 4C). A cross-sectional view of the Pelton wheel 410 in FIG. 4A along the line/plane A-A' is shown in FIG. 4B. The Pelton wheel 410 converts the forward thrust (force) to a rotation force. At the center of the Pelton wheel 410 is a shaft 432 connected to a propeller set 430. The Pelton wheel 410 rotates the propeller set 430, and the propeller set 430 generates a force that rotates the air tube or blade 210 and the support arm 220. In the present system, assuming the combined air tube or blade 210 and the support arm 220 is sufficiently long, combustion/detonation of only a small amount of fuel (which can significantly expand the compressed air at the end of the tube 210) can provide significant thrust, in turn rotating the Pelton wheel 410 at a high rate and causing subsequent rotation of the air tube 210 in a manner and/or at a rate comparable to that of conventional/modern wind turbines.

Figure 5:
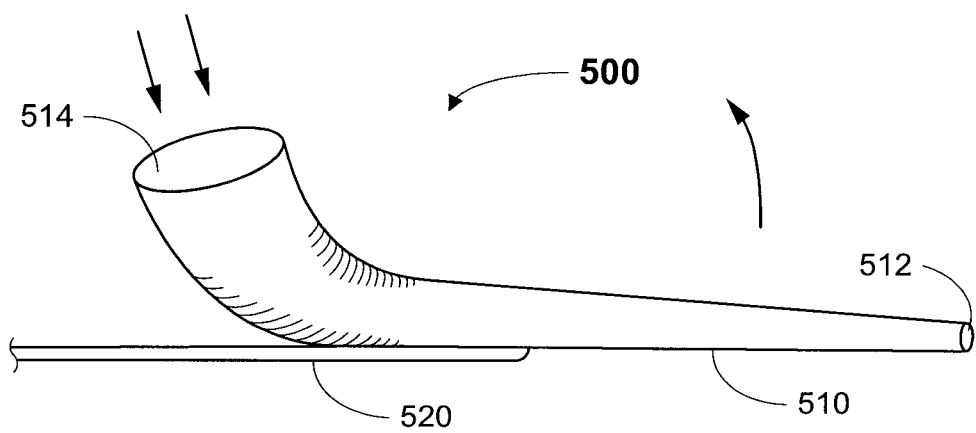
FIG. 5 shows an alternative rotary arm according to one or more embodiments of the present invention.

The air tube or blade 210 is, in turn, fastened or fixed to a long support rod 220 connected to the drive (rotary) shaft of the electricity generator 230. The combined air tube 210 and rod 220 may have a length of 100 m or more (e.g., up to about 120 m). There may be two or more (e.g., 3, 4, 6, etc.) air tubes or air inlets 214a-b connected inline to the rotary generator shaft. Multiple air tubes 210 may be evenly distributed (e.g., 360°/n apart, where n is the number of tubes) around the rotary generator shaft driven by the central hub 225. Alternatively, the tube 510 may have a single inlet 514, as shown in FIG. 5.

The system works by first initiating combustion in the combustion chamber 300. Alternatively, rotation of the tube or blade 210, support arm and hub 225 may be initiated using a starter crank or similar rotation-initiating mechanism. The air mass first drawn naturally through the air inlets 214a-b into the air passage 250 in the tube or blade 210 is pushed outward by centrifugal force and compressed as it travels through the air passage 250. To facilitate this flow and compression, the air passage 250 may comprise a long tube with a smooth interior surface. The cross-sectional area of the air passage 250 decreases as a function of distance from the hub 225, and thus, the air in the air passage 250 becomes more and more compressed (i.e., has a higher density) as it travels farther from the hub 225.

To initiate combustion, a small volume of fuel (on the order of a microliter to a few ml, depending on the internal volume and configuration of the combustion chamber 300) is injected into the combustion chamber 300 and ignited. The fuel may be injected using a small pump (not shown, but located for example in the hub 225 or generator 230 [FIG. 2A]). The explosion from the resulting combustion or detonation of the fuel heats and expands the compressed air in the combustion chamber 300 and forces/pushes the heated and/or expanded air through the nozzle 212. In some embodiments, combustion in the combustion chamber 300 is continuous; in other embodiments, it occurs in pulses.

The linear speed at the distal end of the tube or blade 210 can be sufficiently high to provide at least some cooling for the combustion chamber 300. Furthermore, use of a strong and light-weight material, such as fiberglass, for the bulk of the tube or blade 210 also increases the efficiency of the system.

The high-pressure and/or high-energy expanded air and the exhaust is thrust out of the combustion chamber 300 through the nozzle 212, and the reaction force results in rotation of the Pelton wheel 410 (see, e.g., FIG. 4B) in the third section of the present system. The Pelton wheel 410 is connected to a propeller 430 (FIGS. 4A and 4C) through an axle or shaft 432. Thus, rotations of the Pelton wheel 410 drive rotations of the propeller 430, which pulls the tube or blade 210 in rotary motion around the hub 225.

Continuous combustion (e.g., in a ramjet combustion chamber) provides continuous thrust for driving the Pelton wheel 410, and pulsed combustion (e.g., in a detonation-type combustion chamber) ignites the fuel in repeating cycles (compressed air and fuel enter the combustion chamber 300, the fuel is ignited, the compressed air absorbs heat from the fuel combustion/detonation, then it expands and exits the combustion chamber 300). After a certain number of cycles (e.g., 1-5 in some cases), the combustion chamber 300 may become sufficiently hot that the fuel auto-ignites (i.e., burns or detonates from the residual heat in the combustion chamber 300), and an externally-supplied charge for ignition is not necessary.

The Pelton wheel 410 comprises a plurality of collectors or vanes 412a-b, 414a-b, 416a-b and 418a-b on both the outer surface and the inner surface of the Pelton wheel 410, but in some embodiments, the receivers or cups may be only on the outer surface of the Pelton wheel 410. Also, four (4) sets of collectors or vanes 412a-b, 414a-b, 416a-b and 418a-b are shown, but any integer number of receivers or cups (or of pairs of receivers or cups) may be employed. In certain embodiments, the number of receivers/cups (or of pairs of receivers/cups) is comprise x, where x is a positive integer (i) of at least 2 and (ii) by which 360 can be divided to give an integer or a regular fraction. The Pelton wheel 410 is joined or connected to the propeller shaft 432 by a brace or frame 435.

The Pelton wheel 410 may comprise two parallel rings joined to each other by a plurality of rods or braces 422 and 426. In the example shown in FIGS. 4A-C, the Pelton wheel 410 has four (4) rods or braces (those other than rods or braces 422 and 426 are not shown or not identified). Each of the rods or braces 422, 426 and others supports a corresponding pair of the collectors or vanes 412a-b, 414a-b, 416a-b and 418a-b. However, additional rods or braces may be spaced around the parallel rings of the Pelton wheel 410 as desired.

The rings of the Pelton wheel 410 may have a diameter of from 10 cm to 10 m, or any diameter or range of diameters therein, although the invention is not limited to this range. Generally, the Pelton wheel 410 has a diameter and a height that scales with the combined length of the tube or blade 210 and support arm 220, although a balance between dimensions sufficiently large to capture and/or transfer thrust efficiently to the propeller 430 and dimensions sufficiently small to minimize aerodynamic drag (e.g., as the tube or blade 210 and support arm 220 rotate) may be desirable.

The rings of the Pelton wheel 410 may also be spaced apart (corresponding to the height of the Pelton wheel 410) by a distance corresponding to the dimension(s) of the nozzle 212. For example, this distance may be 1.0-2.0 times the diameter, width or height of the nozzle 212 (e.g., from 3 cm to 3 m), although the invention is not limited to this range.

The collectors or vanes 412a-b, 414a-b, 416a-b and 418a-b also have dimensions that correspond to the dimension(s) of the nozzle 212. For example, each of the collectors or vanes 412a-b, 414a-b, 416a-b and 418a-b may also have a width and length 1.0-2.0 times the diameter, width or height of the nozzle 212 (e.g., from 3 cm to 3 m), and the width of the receivers or cups may be independent of the corresponding length. The collectors or vanes 412a-b, 414a-b, 416a-b and 418a-b may also have a depth that balances aerodynamics (favoring a relatively small depth) with mechanical rigidity and reliability (favoring a relatively large depth). For example, the maximum depth of the collectors or vanes 412a-b, 414a-b, 416a-b and 418a-b may be from 0.5 cm to 50 cm (or any depth or range of depths therein), although the invention is not limited to this range.

The propeller 430 in FIGS. 4A and 4C drives rotation of the long support arm 220 and tube or blade 210 around the shaft of the generator 230 to generate electricity. The propeller 430 as shown includes a rotary shaft 432 around which a plurality of blades 434 and 436 rotate. The propeller 430 as shown includes three (3) blades, only two of which are shown, but the propeller can have any integer number of from 2 to 6 blades. The blades 434 and 436 may have a length of from 20 cm to 20 m, or any length or range of lengths therein, but the invention is not limited to this range.

The shaft 432 may have a length of from 5 cm to 5 m, or any length or range of lengths therein, and a diameter of from 1 cm to 1 m, or any diameter or range of diameters therein, but the invention is not limited to such ranges. In general, the rotary shaft 432 is configured to balance a minimal mass with a length sufficient to reduce or minimize potential interference of air flow or turbulence immediately downstream from the blades 434 and 436 from the heated or expanded air ejected from the nozzle 212. To further this objective, the system may further include a shield 440, secured or affixed to the rotary shaft 432 and between the Pelton wheel 410 and the blades 434 and 436. The shield 440 may be conical or convex (with reference to the direction of motion), and have dimensions configured to direct air flow around the Pelton wheel 410. For example, the shield 440 may have an outermost diameter that is 1.0-1.5 times the diameter of the rings of the Pelton wheel 410, although the invention is not limited to this range.

Referring now to FIG. 4C, the Pelton wheel 410 and propeller 430 are attached to the tube or blade 210 by a connector arm or frame 450. The Pelton wheel 410 may be secured to or mounted to one end of the connector arm or frame 450 at the center of the Pelton wheel 410, and the other end of the connector arm or frame 450 is secured to the tube or blade 210 by a clamp 454. To improve the mechanical rigidity and reliability of the connector arm or frame 450, it may further include one or more braces 452a-b at each bend, turn or angle of the connector arm or frame 450. The connector arm or frame 450 generally has dimensions enabling the collectors or vanes 412a-b, 414a-b, 416a-b and 418a-b on the Pelton wheel 410 to receive the heated/expanded gasses from the nozzle 212 with a minimal distance between the nozzle and the collectors or vanes (and/or between the air tube or blade 210 and the Pelton wheel 410).

The combined length of the tube or blade 210 and support arm 220 plays a pivotal role in electricity generation, because the torque provided to the generator 230 is equal or approximately equal to the combined length of the tube or blade 210 and support arm 220 multiplied by the rotational force of the combined tube or blade 210 and support arm 220.

Torque is the product of the force of the rotor and the radius of the rotor, which is directly related to the combined length of the tube or blade 210 and support arm 220. When the diameter of the rotor exceeds a certain threshold (e.g., 50-100 meters), a small amount of thrust from the combustion chamber 300 can generate a significant amount of torque. A small amount of fuel combustion, when combined with the highly compressed air passing through the tube or blade 210 (and being heated by the combustion chamber 300), may generate more torque than without the combustion chamber 300.

A relatively long support arm and air tube or blade combination is advantageous to the present system. The reaction force of the heated and/or expanded gas from the combustion chamber 300 assists rotation of the turbine, and increases the rotation speed relative to conventional HWTs. When the present turbine rotates at a faster rate, the centrifugal force on the air in the tube or blade 210 increases due to the higher rotation speed, and as a result, the air becomes more compressed (i.e., has a higher pressure), which generates more thrust when heated or expanded in the combustion chamber, resulting in an even higher rotation speed, etc. This "self-amplifying" effect results in a process for electrical power generation that may have a greater efficiency than in the absence of the combustion chamber 300.

Of course, in the presence of a sufficiently strong wind (e.g., 3-5 m/s or greater), there is no need for fuel combustion to drive rotation of the propeller 430. Thus, in some further embodiments, the system may further include an anemometer (not shown) that determines the wind velocity at or near the generator 230, and when the wind velocity is at or above a threshold speed (e.g., ≥3-5 m/s), combustion in the chamber 300 may be discontinued or turned off. Wind is generally not an energy source that is constant or reliable, however. As a result, by controlling fuel consumption in the combustion chamber 300, the rotation speed of the combined tube or blade 210 and support arm 220 may be maintained at a minimum or optimum value for electricity generation, and the electricity output from the generator 230 can be controlled and/or regulated. Therefore, regulating/controlling the fuel supply according to the wind speed and/or variations therein can increase and/or stabilize the power output from the generator 230.

Alternative Rotary Arms/Tubes

FIG. 5 shows an alternative air tube or blade 510, secured to a support arm 520 and having a single air inlet 514. Otherwise, the combined air tube or blade 510 and support arm 520 (combination 500 in FIG. 5) is essentially identical to the combined support arm 220 and tube or blade 210 in FIG. 2A.

Figure 6:
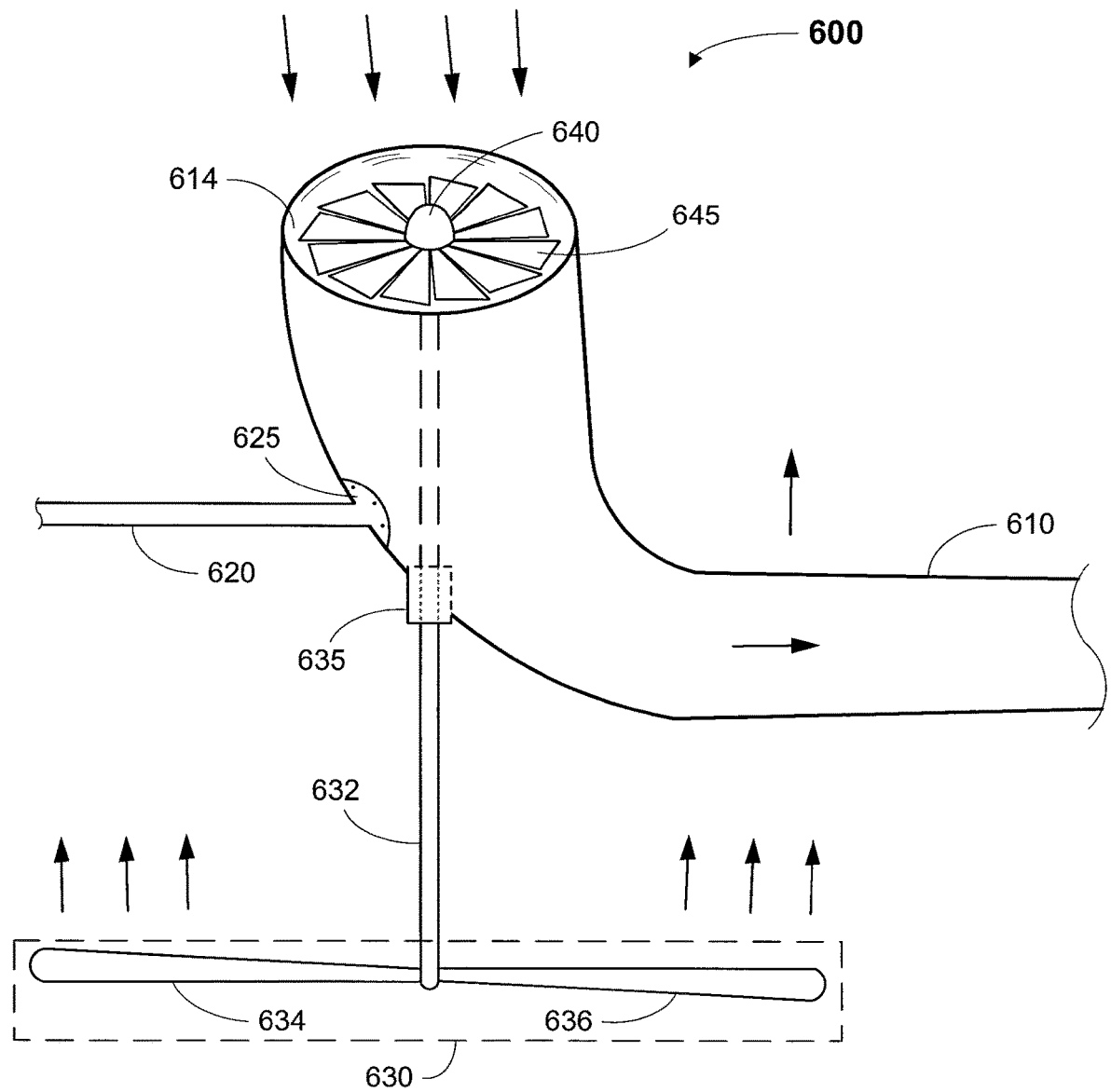
FIG. 6 shows a further alternative rotary arm and propeller in accordance with one or more embodiments of the present invention.

FIG. 6 shows an alternative arm-and-tube system 600 that may increase the ability of the air tube to compress the air therein, and thus improve the efficiency of fuel combustion in the combustion chamber. The system 600 includes an air tube 610 with an air inlet 614, a fan 645 in the air inlet 614, a hub 640 on the fan 645, and a support arm 620 having a fastening plate 625 at a distal end thereof. The air tube 610 is secured to the fastening plate 625 by welding or with a plurality of screws, bolts, bolt-and-nut fasteners, rivets, an adhesive, a combination thereof, etc. The hub 640 secures the fan 645 to a rotary shaft 632. The rotary shaft 632 passes through a bearing 635 in the wall of the air tube 610, and is connected to a second propeller 630 comprising blades 634 and 636.

The blades 634 and 636 are generally smaller than those in the propeller 430 in FIGS. 4A and 4C. Depending on the length of the support arm 620 relative to the length of the air tube 610, the blades 634 and 636 may have a length of from 10 cm to 10 m, or any length or range of lengths therein, but the invention is not limited to this range. Alternatively, the blades 634 and 636 may have a length of a×b×c, where a is the percentage or proportion of the length of the support arm 620 to the combined lengths of the support arm 620 and the air tube 610, b is the length of the blades in the propeller 430, and c is a design factor of, e.g., 0.5-1.5, but the invention is not limited to this range. Depending on the dimensions of the air tube 610, the shaft 632 may have a length of from 3 cm to 3 m, or any length or range of lengths therein, and a diameter of from 0.5 cm to 0.5 m, or any diameter or range of diameters therein, but the invention is not limited to such ranges. In general, the rotary shaft 632 is as short as possible, to minimize the mass and aerodynamic drag of the propeller 630.

The air tube 610 includes a combustion chamber at its distal end, similar or identical to the combustion chamber 300 of FIG. 3, and a Pelton wheel is attached thereto, similar or identical to the Pelton wheel 410 of FIGS. 4A-C. Thus, as the combustion chamber burns fuel and heats/expands the air exiting the nozzle, and the heated/expanded air rotates the Pelton wheel and the first propeller, the air tube 610 and support arm 620 rotate, thereby drawing air into the air inlet 614. The air entering the air inlet 614 rotates the fan 645, similar to a compressor fan in a turbine engine. In turn, the fan 645 rotates the second propeller 630, which adds to the rotational force of the air tube 610 and support arm 620 and increases the torque on the low-speed shaft in the generator 230. Thus, the fan 645 and the second propeller 630 recover some energy that would otherwise be lost.

An Exemplary Method of Generating Electricity

The present invention further relates to a method of generating electricity. In general, the method of generating electricity comprises igniting, burning or detonating a fuel in one or more combustion chambers, each at a distal end of a corresponding tube or blade connected to a central hub; expelling (i) air heated or expanded in the combustion chamber and (ii) combustion gases from the combustion chamber through a nozzle at the distal end of the corresponding tube or blade; rotating a Pelton wheel configured to receive the heated or expanded air and the combustion gases; driving a propeller from rotations of the Pelton wheel, the propeller being configured to rotate the tube or blade; rotating an axle or shaft joined or fixed to the hub to generate a torque; and converting the torque to electricity using a generator. The tube or blade may be connected to a support arm that is, in turn, connected to the central hub. Generally, the number of combustion chambers, the number of tubes or blades and the number of support arms is the same. In practice, the method is performed continuously and/or in cycles (e.g., combustion cycles), so the initial and final steps (and even the sequence of steps itself) in the method is not particularly critical.

In an exemplary method of generating electricity in accordance with embodiments of the present invention, a fuel, such as a flammable hydrocarbon or alcohol (e.g., a gas such as methane, propane, butane, hydrogen, etc., a liquid such as methanol, ethanol, butanol, gasoline, diesel fuel, biodiesel, kerosene, etc., and combinations thereof) is supplied to a combustion chamber at a distal end of a corresponding tube or blade connected to a central hub, typically through a support arm as described herein. The combustion chamber may comprise a ramjet, in which case the fuel combustion is continuous. In many embodiments, the method further comprises supplying the fuel to the combustion chamber through a fuel supply conduit. For example, the method may further comprise pumping the fuel from a fuel storage tank or vessel as described herein into the fuel supply conduit and/or storing the fuel in the fuel storage tank or vessel.

In some embodiments, the method may further comprise determining whether the fuel should be burned or detonated, and if so, should the fuel be ignited. For example, one may measure the wind velocity in the vicinity of the generator (e.g., using an anemometer), and when the wind velocity meets or exceeds a predetermined threshold, the fuel may not be supplied to the combustion chamber or burned or detonated. To the contrary, when the wind velocity is below the predetermined threshold, the fuel may be supplied to the combustion chamber and burned or detonated.

Similarly, one may measure the temperature of the combustion chamber (e.g., using a thermometer, a thermocouple, or a pyrometer), and one if the combustion chamber is sufficiently hot to auto-ignite the fuel, then auto-ignition (automatic burning or detonation of the fuel in the combustion chamber) is possible, and the fuel does not need to be ignited using an external ignition source. When auto-ignition is not possible (for example, at the outset of the method, during the first few cycles of the method, etc.), the method includes igniting the fuel.

For example, the fuel may be ignited in the combustion chamber using an igniter, and optionally, the method may further comprise providing an electrical charge to the igniter. In general, each combustion chamber may have one igniter, such as a spark plug, an arc generator, or other ignition source. In some embodiments, after a number of cycles of ignition-initiated combustion or detonation (e.g., 1-10 cycles), the combustion chamber may retain sufficient heat to enable automatic ignition, combustion or detonation ("auto-combustion") of the fuel upon injection of a threshold amount of vaporized fuel in the presence of the compressed air in the combustion chamber.

Combustion of the fuel heats and/or expands the compressed air passing through the combustion chamber, and the heated and/or expanded air and the combustion gases from the combustion chamber are expelled through a nozzle towards a Pelton wheel, which rotates in response to the heated and/or expanded air and combustion gases. Typically, each nozzle has an inner diameter that is less than an inner diameter of the combustion chamber.

The rotating Pelton wheel rotates a propeller, which in turn provides a force that rotates the air tube or blade and support arm. The rotating air tube/blade and support arm rotates an axle or shaft in the generator that is joined or fixed to the central hub to generate a torque, and the generator converts the torque to electricity. In some embodiments (e.g., using the "horizontal engine"), the air tube or blade rotates in a vertical plane. In other embodiments (e.g., using the "vertical engine"), the air tube or blade rotate in a horizontal plane. In methods using either the horizontal engine or the vertical engine, the method may further comprise transferring the torque from the axle or shaft (which may be a low-speed shaft) to a high-speed shaft using a transmission, differential and/or gear box. In such embodiments, the high-speed shaft rotates at a faster rate than that of the axle or shaft. For example, the high-speed shaft may rotate at a rate that is m/n times the rotation rate of the lower axle or shaft, where m is an integer≥2 (e.g., 3-100 or any value or range of values therein, such as 5-50, 10-25, etc.), and n is an integer≥1 (e.g., 1-15 or any value or range of values therein). In some cases, m is not divisible by n, and n may be a prime number.

The method may also further comprise storing the electricity from the generator in a battery. The battery may be housed in the same enclosure as the generator, or in a different enclosure. Thus, the method may further comprise carrying the electricity generated by the generator to the battery with an electrical cable. Alternatively or additionally, the method may further comprise transferring the electricity to an electrical grid (e.g., from either the generator or the battery) using an inverter or converter.

In the present method, the air is drawn into the air tube or blade (or a passage therein) through an opening or inlet. In general, the opening is on a side of the tube or blade facing the direction of rotation of the tube or blade. The air then flows through the tube or blade (or the passage) to the combustion chamber and increasingly compresses as it gets closer to the combustion chamber, as described herein.

In some embodiments, as the air enters the air tube or blade, it may cause a fan in the air inlet to rotate, in turn causing a second propeller to rotate. The second propeller adds to the rotational force from the tube or blade and support arm on the central hub, and thus, on the low-speed shaft in the generator.

The method may use x tube or blades, where x is a positive integer by which 360 can be divided to give an integer or a regular fraction. Thus, although the method may use three or more tubes or blades, it can also use two tubes or blades, four or more tubes or blades, or even a single tube or blade. However, the presence of four or more tubes or blades in the system may generate some turbulence and/or aerodynamic interference. In the present method, as for present engine, the tube or blade and the support arm may have a combined length of from 1 to 120 m, and the hub may have a diameter of from 10 cm to 8 m.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An electricity generating system, comprising:
   a) one or more rotary arms extending from a central hub;
   b) a tube or blade with an air passage therein extending from each of the one or more rotary arms, the air passage having one or more air inlets at or near an end of the tube or blade that is connected or joined to a corresponding one of the one or more rotary arms;
   c) a set of rotary blades operably connected to the tube or blade, configured to provide a force that rotates the tube or blade;
   d) an axle or shaft joined or fixed to the central hub and configured to rotate with the central hub;
   e) a generator operably connected to the axle or shaft, configured to convert a torque from the axle or shaft to electricity; and
   f) a tower configured to support the one or more rotary arms, the central hub, the tube or blade, and the axle or shaft.

2. The system of claim 1, further comprising a transmission, differential and/or gear box configured to transfer the torque from the axle or shaft to a high-speed shaft adapted to rotate at a faster rate than the axle or shaft.

3. The system of claim 1, wherein each of (i) the one or more rotary arms and (ii) the tube or blade has a combined length of from 1 to 120 m, and the central hub has a diameter of from 10 cm to 8 m.

4. The system of claim 1, wherein the tube or blade has an aerodynamic cross-sectional shape.

5. The system of claim 1, wherein each of the one or more air inlets faces a direction of rotation of the tube or blade, to allow the air to enter the air passage.

6. An electricity generating system, comprising:
   a) one or more rotary arms extending from a central hub;
   b) a tube or blade with an air passage therein extending from each of the one or more rotary arms, the air passage having one or more air inlets at or near an end of the tube or blade that is connected or joined to a corresponding one of the one or more rotary arms;
   c) a set of rotary blades operably connected to the tube or blade, configured to provide a force that rotates the tube or blade;
   d) an axle or shaft joined or fixed to the central hub and configured to rotate with the central hub; and
   e) a generator operably connected to the axle or shaft, configured to convert a torque from the axle or shaft to electricity, wherein:

the tube or blade further comprises (i) a combustion or detonation chamber at a distal end of the tube or blade, configured to receive air from the air passage and fuel from a fuel supply conduit, and (ii) a nozzle downstream from the combustion or detonation chamber, configured to output heated or expanded air and combustion gases from the combustion or detonation chamber, and the system further comprises a Pelton wheel configured to receive the heated or expanded air and combustion gases from the combustion or detonation chamber and rotate in response thereto, the set of rotary blades being driven by rotations of the Pelton wheel.

7. The system of claim 6, wherein the combustion or detonation chamber comprises a ramjet configured to burn or detonate a fuel and heat the air from the air passage.

8. The system of claim 7, wherein the ramjet comprises a manifold configured to distribute the fuel to a plurality of sprayers or injectors in the combustion or detonation chamber.

9. The system of claim 8, further comprising a fuel supply conduit in fluid communication with the manifold, configured to supply the fuel to the manifold.

10. The system of claim 6, wherein the set of rotary blades comprises a propeller connected to the Pelton wheel.

11. The system of claim 6, wherein:
the tube or blade further comprises (i) a fan at or in at least one of the one or more air inlets, configured to rotate in response to the air entering the at least one of the one or more air inlets, and (ii) an outlet at a distal end of the tube or blade; and
the set of rotary blades comprises a propeller connected to the fan.

12. The system of claim 11, further comprising a connecting shaft connected to each of the fan and the propeller.

13. The system of claim 12, wherein the connecting shaft passes through a wall of the tube or blade.

14. The system of claim 6, further comprising a transmission, differential and/or gear box configured to transfer the torque from the axle or shaft to a high-speed shaft adapted to rotate at a faster rate than the axle or shaft.

15. The system of claim 6, wherein each of (i) the one or more rotary arms and (ii) the tube or blade has a combined length of from 1 to 120 m, and the central hub has a diameter of from 10 cm to 8 m.

16. The system of claim 6, wherein each of the one or more air inlets faces a direction of rotation of the tube or blade, to allow the air to enter the air passage.

17. An electricity generating system, comprising:
a) one or more rotary arms extending from a central hub;
b) a tube or blade with an air passage therein extending from each of the one or more rotary arms, the air passage having one or more air inlets at or near an end of the tube or blade that is connected or joined to a corresponding one of the one or more rotary arms;
c) a set of rotary blades operably connected to the tube or blade, configured to provide a force that rotates the tube or blade;
d) an axle or shaft joined or fixed to the central hub and configured to rotate with the central hub; and
e) a generator operably connected to the axle or shaft, configured to convert a torque from the axle or shaft to electricity,
wherein each of the one or more air inlets faces a direction of rotation of the tube or blade, to allow the air to enter the air passage.

18. The system of claim 17, further comprising a tower configured to support the one or more rotary arms, the central hub, the tube or blade, and the axle or shaft.

19. The system of claim 17, further comprising a transmission, differential and/or gear box configured to transfer the torque from the axle or shaft to a high-speed shaft adapted to rotate at a faster rate than the axle or shaft.

20. The system of claim 17, wherein each of (i) the one or more rotary arms and (ii) the tube or blade has a combined length of from 1 to 120 m, and the central hub has a diameter of from 10 cm to 8 m.

21. The system of claim 17, wherein the tube or blade has an aerodynamic cross-sectional shape.

* * * * *